(12) United States Patent
Heglund (10) Patent No.: US 6,359,412 B1
(45) Date of Patent: Mar. 19, 2002

(54) COMMUTATION APPARATUS AND METHOD FOR A FOUR STATE SENSORLESS SWITCHED RELUCTANCE MACHINE SYSTEM UTILIZING MACHINE WINDING CURRENT SENSING

(75) Inventor: William S. Heglund, Davis Junction, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 861 days.

(21) Appl. No.: 08/629,700

(22) Filed: Apr. 9, 1996

(51) Int. Cl.$^7$ ................................................. H02P 7/36
(52) U.S. Cl. ....................................................... 318/701
(58) Field of Search ................................. 318/701, 254, 318/138, 439, 685, 696

(56) References Cited

U.S. PATENT DOCUMENTS 3,667,013 A * 5/1972 Bicking ....................... 318/701
4,331,924 A   5/1982 Elliott et al. .................. 377/47

(List continued on next page.)

FOREIGN PATENT DOCUMENTS

| EP | 276625 | 8/1988 |
|----|--------|--------|
| EP | 401818 | 12/1990 |
| WO | WO9411945 | 5/1994 |

OTHER PUBLICATIONS

Reynolds et al, "Robust Estimation of Covariance Matrices", IEEE Transactions on Automatic Control, Sep. 9, 1990.

Cailleux et al, "Effect of the Sampling and of the Phase Communication in Nonlinear Position Control of a Switched Reluctance Motor–Analysis and Compensation", Proceedings of the 32$^{nd}$ Conference on Design and Control, Dec. 1993.

(List continued on next page.)

Primary Examiner—Anthony Wysocki
(74) Attorney, Agent, or Firm—Marshall, O'Toole, Gerstein, Murray & Borun (57) ABSTRACT

A control for operating an inverter coupled to a switched reluctance machine is responsive to the magnitudes of current flowing in the phase windings of the machines and controls switches in legs of the inverter based upon such magnitude.

14 Claims, 13 Drawing Sheets

U.S. PATENT DOCUMENTS

| | | | |
|---|---|---|---|
| 4,374,351 A | | 2/1983 | Fishman et al. ............ 318/600 |
| 4,447,788 A | * | 5/1984 | Mundt et al. ........... 318/701 X |
| 4,455,513 A | | 6/1984 | Fulton et al. ............... 318/138 |
| 4,553,078 A | | 11/1985 | Wise .......................... 318/594 |
| 4,611,157 A | | 9/1986 | Miller et al. ................ 318/696 |
| 4,642,543 A | | 2/1987 | MacMinn ................... 318/696 |
| 4,739,240 A | * | 4/1988 | MacMinn et al. .......... 318/696 |
| 4,772,839 A | | 9/1988 | MacMinn et al. .......... 318/696 |
| 4,825,055 A | | 4/1989 | Pollock ...................... 235/411 |
| 4,868,478 A | * | 9/1989 | Hedlund et al. ........ 318/701 X |
| 4,933,620 A | * | 6/1990 | MacMinn et al. .......... 318/696 |
| 4,959,596 A | | 9/1990 | MacMinn et al. .......... 318/254 |
| 4,959,823 A | | 9/1990 | Getreuer et al. ......... 369/44.13 |
| 5,007,007 A | | 4/1991 | van Zanten et al. ........ 364/574 |
| 5,097,190 A | | 3/1992 | Lyons et al. ................ 318/701 |
| 5,105,137 A | | 4/1992 | Iijima ......................... 318/568 |
| 5,107,195 A | | 4/1992 | Lyons et al. ................ 318/701 |
| 5,115,180 A | | 5/1992 | Chung ........................ 318/618 |
| 5,140,243 A | * | 8/1992 | Lyons et al. ................ 318/701 |
| 5,140,244 A | | 8/1992 | Lyons et al. ................ 318/701 |
| 5,144,564 A | | 9/1992 | Naido et al. ................ 364/494 |
| 5,159,254 A | | 10/1992 | Teshima ..................... 318/611 |
| 5,165,051 A | | 11/1992 | Kumar ......................... 324/79 |
| 5,173,650 A | | 12/1992 | Heglund ..................... 318/701 |
| 5,196,775 A | | 3/1993 | Harris et al. ................ 318/638 |
| 5,248,921 A | | 9/1993 | Kato et al. .................. 318/560 |
| 5,291,115 A | | 3/1994 | Ehsani ........................ 318/701 |
| 5,296,785 A | | 3/1994 | Miller ......................... 318/696 |
| 5,296,794 A | | 3/1994 | Lang et al. .................. 318/715 |
| 5,325,026 A | | 6/1994 | Lyons et al. ................ 318/254 |
| 5,332,955 A | | 7/1994 | Hopper ....................... 318/632 |
| 5,381,081 A | | 1/1995 | Radun ......................... 318/701 |
| 5,394,323 A | | 2/1995 | Yellowley et al. .......... 364/167 |
| 5,404,091 A | | 4/1995 | Radun et al. ............... 318/701 |
| 5,410,235 A | * | 4/1995 | Ehsani ........................ 318/701 |
| 5,448,149 A | * | 9/1995 | Ehsani et al. ............... 318/701 |
| 5,467,025 A | | 11/1995 | Ray ............................ 324/772 |
| 5,488,531 A | | 1/1996 | Aldridge et al. .............. 363/56 |
| 5,491,622 A | | 2/1996 | Carosa ......................... 363/56 |
| 5,493,195 A | * | 2/1996 | Heglund et al. ............ 318/701 |
| 5,499,186 A | | 3/1996 | Carosa ......................... 363/56 |
| 5,525,886 A | * | 6/1996 | Lyons et al. ................ 318/701 |
| 5,525,887 A | * | 6/1996 | Van Sistine ............ 318/254 X |
| 5,537,019 A | * | 7/1996 | Sistine et al. ............... 318/701 |
| 5,589,751 A | * | 12/1996 | Lim ........................... 318/701 |
| 5,627,444 A | | 5/1997 | Fulks .......................... 318/701 |
| 5,627,445 A | * | 5/1997 | Webster ...................... 318/701 |
| 5,637,974 A | | 6/1997 | McCann ..................... 318/701 |

OTHER PUBLICATIONS

N.M. Mvungi et al., "Sensorless Rotor Position in an SR Motor", European Conference on Power Electronics and Application, Sep. 3–6, 1991.

Ertugrul et al., "Real–Time Estimation of Rotor Position in PM Motors During Transient Operation", The European Power Electronics Association, 1993.

Jones et al., "Performance of a High Speed Switched Reluctance Starter/Generator System Using Electronic Position Sensing", Record of the Industry Applications Conference, Oct. 8–12, 1995.

Ramoni et al., "New Communication Methods in Switched Reluctance Motors Based on Active Phase Vectors", Proceedings of the Annual Power Electronics Specialists Conference, Jun. 20–24, 1994.

MacMinn et al., "Applications of Sensor Integration Techniques to Switched Reluctance Motor Drives", IEEE Industry Applications Society Annual Meeting, Oct. 2–7, 1988.

Panda et al., "Further Developments in Indirect–Rotor Position Sensing of Variable–Reluctance Motors Using Wave Form Detection Technique", Power Electronics, Nov. 15–19, 1993.

Design and Implementation of a Five Horsepower, Switched Reluctance, Fuel–Lube, Pump Motor Drive for a Gas Turbine Engine written by Caio A. Ferreira, Stephen R. Jones, Barry T. Drager and William S. Heglund, IEEE Ninth Annual Applied Power Electronics Conference and Exposition, Feb. 13–17, 1994.

*Practical Indirect Position Sensing for a Variable Reluctance Motor* written by Walter D. Harris and submitted to the Massachusetts Institute of Technology, May 1987.

*Application of Sensor Integration Techniques to Switched Reluctance Motor Drives* written by Stephen R. MacMinn, William J. Rzesos, Paul M. Szczesny and Thomas M. Jahns, published in IEEE vol. 28, No. 6, Nov./Dec. 1992.

*New Modulation Encoding Techniques for Indirect Rotor Position Sensing in Switched Reluctance Motors*, written by Mehrdad Ehsani, Iqbal Husain, S. Mahajan, and K.R. Ramani, published in IEEE, vol. 30, No. 1, Jan./Feb. 1994.

*Flux/Current Methods for SRM Rotor Position Estimation*, written by J.P. Lyons, S.R. MacMinn and M.A. Preston, published in May 1991 IEEE.

* cited by examiner

COMMUTATION APPARATUS AND METHOD FOR A FOUR STATE SENSORLESS SWITCHED RELUCTANCE MACHINE SYSTEM UTILIZING MACHINE WINDING CURRENT SENSING

BACKGROUND AND SUMMARY OF INVENTION

The present invention relates generally to motors/generators and, more particularly, to high speed switched reluctance machines capable of starting a prime mover as well as generating electrical power for use on aircraft.

The aerospace industry has consistently driven the leading edge of technology with the requirement for lightweight, high efficiency, high reliability equipment. The equipment must be lightweight because each additional pound of weight translates directly into increased fuel burn, and therefore, a higher cost of ownership and shorter range. The need for high efficiency results from the fact that each additional cubic inch required for equipment displaces the amount of revenue-generating cargo and passengers that can be carried on an aircraft. High reliability is important because every minute of delay at the gate increases the cost of ownership, and likewise, increases passenger frustration.

For aircraft electric power generation systems, these pressures have precipitated great advancements in technology, but have also caused problems. Aircraft have typically used synchronous brushless AC generators or permanent magnet generators for electric power generation needs. Unfortunately, both of these types of generators require components which can fail due to the conditions under which they are required to operate (usually mounted directly on the aircraft jet engine).

As an alternative to the use of the synchronous AC or the permanent magnet generator, a switched reluctance machine can be used. A switched reluctance machine is an inherently low cost machine, having a simple construction which is capable of very high speed operation, thus yielding a more lightweight design. The rotor of the switched reluctance machine is constructed from a simple stack of laminations making it very rugged and low cost without the containment problems associated with rotor windings or permanent magnets. Further, the rotor does not require rotating rectifiers, which contribute to failures, as in the AC synchronous machine.

In order to properly operate a switched reluctance machine, it has been found necessary in the past to determine the rotor position in order to properly commutate the currents flowing in the phase windings of the machine. Resolvers are used, particularly in high speed systems, or sometimes encoders in lower speed systems, to obtain a measure of rotor position. However, resolvers and required associated apparatus (chiefly, a resolver-to-digital converter and an excitation circuit) are expensive and both resolvers and encoders are sources of single point failure.

In order to obviate the need for position sensors, such as resolvers or encoders, sensorless operational techniques have been developed. The most trivial solution to sensorless operation is to control the switched reluctance machine as a stepper motor in the fashion disclosed in Bass, et al. U.S. Pat. No. 4,611,157 and MacMinn U.S. Pat. No. 4,642,543. In an alternative technique, machine inductance or reluctance is detected and utilized to estimate rotor position. Specifically, because the phase inductance of a switched reluctance machine varies as a function of angle from alignment of the stator pole for that phase and a rotor pole, a measurement of instantaneous phase inductance can be utilized to derive an estimate of rotor position. See MacMinn, et al. U.S. Pat. No. 4,772,839, MacMinn, et al. U.S. Pat. No. 4,959,596, Harris "Practical Indirect Position Sensing for a Variable Reluctance Motor," Masters of Science Thesis, MIT, May 1987, Harris, et al. "A Simple Motion Estimator for Variable Reluctance Motors," IEEE Transactions on Industrial Applications, Vol. 26, No. 2, March/April, 1990, and MacMinn, et al. "Application of Sensor Integration Techniques to Switched Reluctance Motor Drives," IEEE Transactions on Industry Applications, Vol. 28, No. 6, November/December, 1992.

In a further technique, phase inductance can be determined using a frequency modulation approach whereby a non-torque producing phase forms part of a frequency modulation encoder. See Ehsani, et al. "Low Cost Sensorless Switched Reluctance Motor Drives for Automotive Applications," Texas A&M Power Electronics Laboratory Report (date unknown), Ehsani, et al. "An Analysis of the Error in Indirect Rotor Position Sensing of Switched Reluctance Motors," IEEE Proceedings IECON '91, Ehsani "A Comparative Analysis of SRM Discrete Shaft Position Sensor Elimination by FM Encoder and Pulsed Impedance Sensing Schemes," Texas A&M Power Electronics Laboratory Report, (date unknown) and Ehsani, et al. "New Modulation Encoding Techniques for Indirect Rotor Position Sensing in Switched Reluctance Motors," IEEE Transactions on Industry Applications, Vol. 30, No. 1, January/February, 1994.

A model-based approach to rotor position estimation has been developed by General Electric Company and is disclosed in Lyons, et al. "Flux/Current Methods for SRM Rotor Position Estimation," Proceedings of IEEE Industry Applications Society Annual Meeting, Vol. 1, 1991, and Lyons, et al. U.S. Pat. No. 5,097,190. In this technique, a multi-phase lumped parameter model of the switched reluctance machine is developed and utilized. However, the model has been developed only for a three-phase machine wound in a north-south-north-south-north-south configuration.

A position estimation subsystem has been developed by the assignee of the instant application and includes a relative angle estimation circuit, an angle combination circuit and an estimator including a Kalman filter. The relative angle estimation logic is responsive to the phase current magnitudes of the switched reluctance machine and develops an angle estimate for each phase. The angle combination logic combines the phase angle estimates to obtain an absolute angle estimate which eliminates ambiguities that would otherwise be present. The estimator utilizes a model of the switched reluctance machine system as well as the absolute angle estimate to form a better estimate of the rotor position and velocity and, if necessary or desirable for other purposes, the rotor acceleration. An instantaneous position generation circuit converts the coarse sampled output of the Kalman filter into a signal having position update intervals which are sufficiently fine to properly control commutation.

While the foregoing approach is effective to provide adequate control for a switched reluctance machine, it is desirable to simplify the control to further enhance reliability and reduce cost.

Accordingly, it is an object of the present invention to provide a commutation apparatus and method for a sensorless switched reluctance machine system which is simple, reliable and low in cost. It is further an object of the present invention to provide such a commutation apparatus and method which relies upon the use of current sensors to achieve commutation without the need for calculating or estimating rotor position.

A further object is to provide a commutation apparatus and method which controls switches in an inverter coupled to phase windings of a switched reluctance machine based upon the magnitudes of currents flowing in the phase windings of the machine.

These and other objects and advantages are attained by providing current sensors to sense the phase current magnitudes flowing through the switched reluctance machine and operating a finite state machine to open or close each switch in each inverter leg based upon the sensed current magnitudes. Specifically, the finite state machine controls a pair of switches in each inverter leg such that each machine phase winding is excited or such that the currents flowing through the phase windings freewheel or, alternatively, fly back during operation in a generating mode based upon the magnitude of current flowing through the phase winding. Because there is no need to estimate or calculate rotor position in order to properly commutate currents flowing through the phase windings, the commutation control circuitry can be greatly simplified, leading to high reliability and lower costs.

These and other objects, advantages and novel features of the present invention will become apparent to those skilled in the art from the drawings and following detailed description.

DESCRIPTION OF THE PREFERRED EMBODIMENTS

Figure 1:
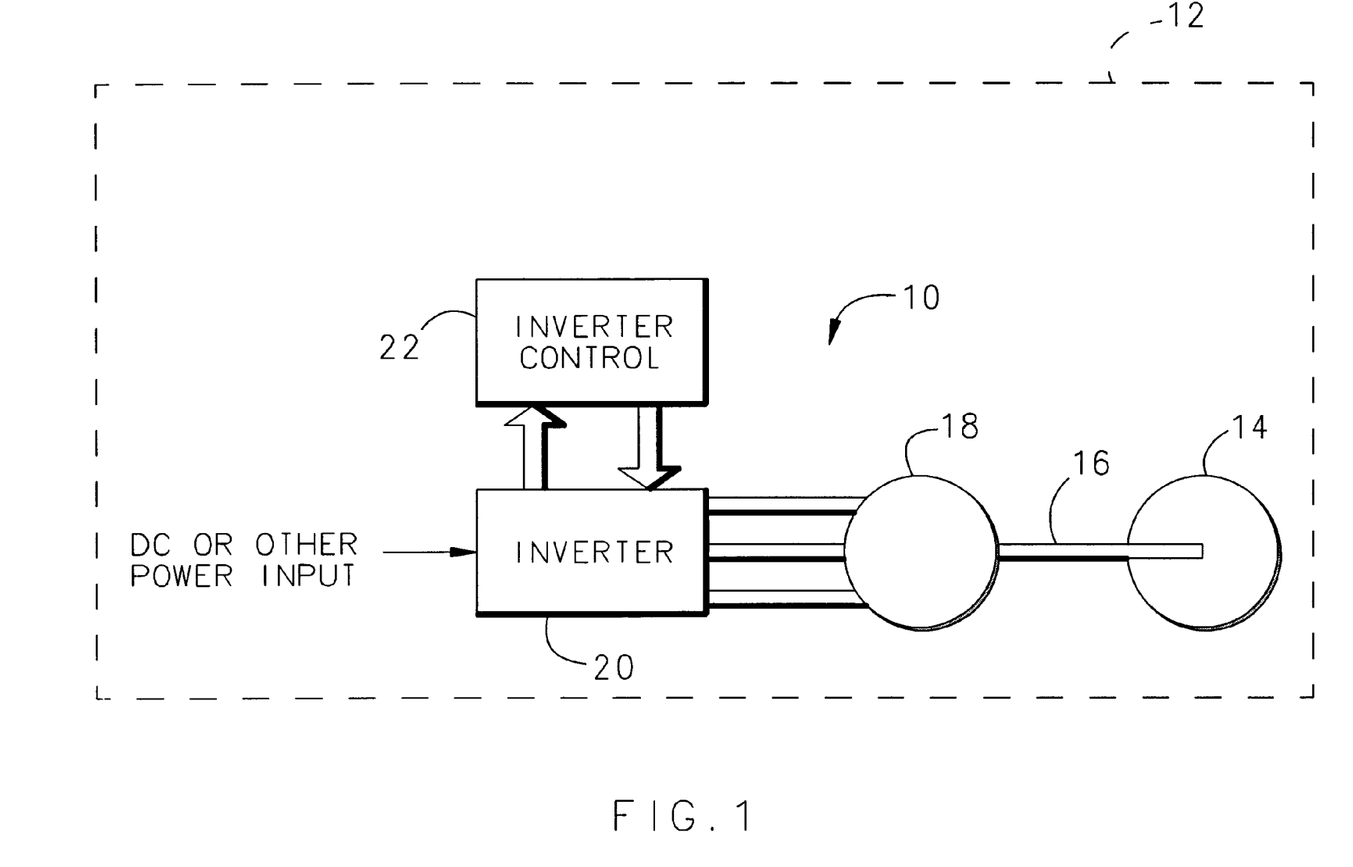
FIG. 1 comprises a block diagram of a generating system for an aircraft.

Referring first to FIG. 1, a power conversion system 10 is provided on-board an aircraft (shown diagrammatically at 12) or other aerospace, land or water vehicle and includes a prime mover, for example, a gas turbine engine 14, which is coupled by a motive power shaft 16 to a switched reluctance machine 18. The machine 18 includes phase windings which are coupled to an inverter 20 operated by an inverter control 22. In a starting mode of operation, DC power is supplied to the inverter 20 and the inverter control 22 develops control signals for switches in the inverter 20 to cause the switched reluctance machine 18 to operate as a motor and supply motive power via the shaft 16 to the gas turbine engine 14 for starting purposes. During operation in a generating mode, motive power is supplied by the gas turbine engine to the switched reluctance machine 18 via the shaft 16 and the resulting electrical power developed by the switched reluctance machine 18 is converted by the inverter 20 into DC power for one or more loads. If necessary or desirable, the inverter 20 could be modified to develop constant frequency AC power for one or more AC loads.

Figure 2:
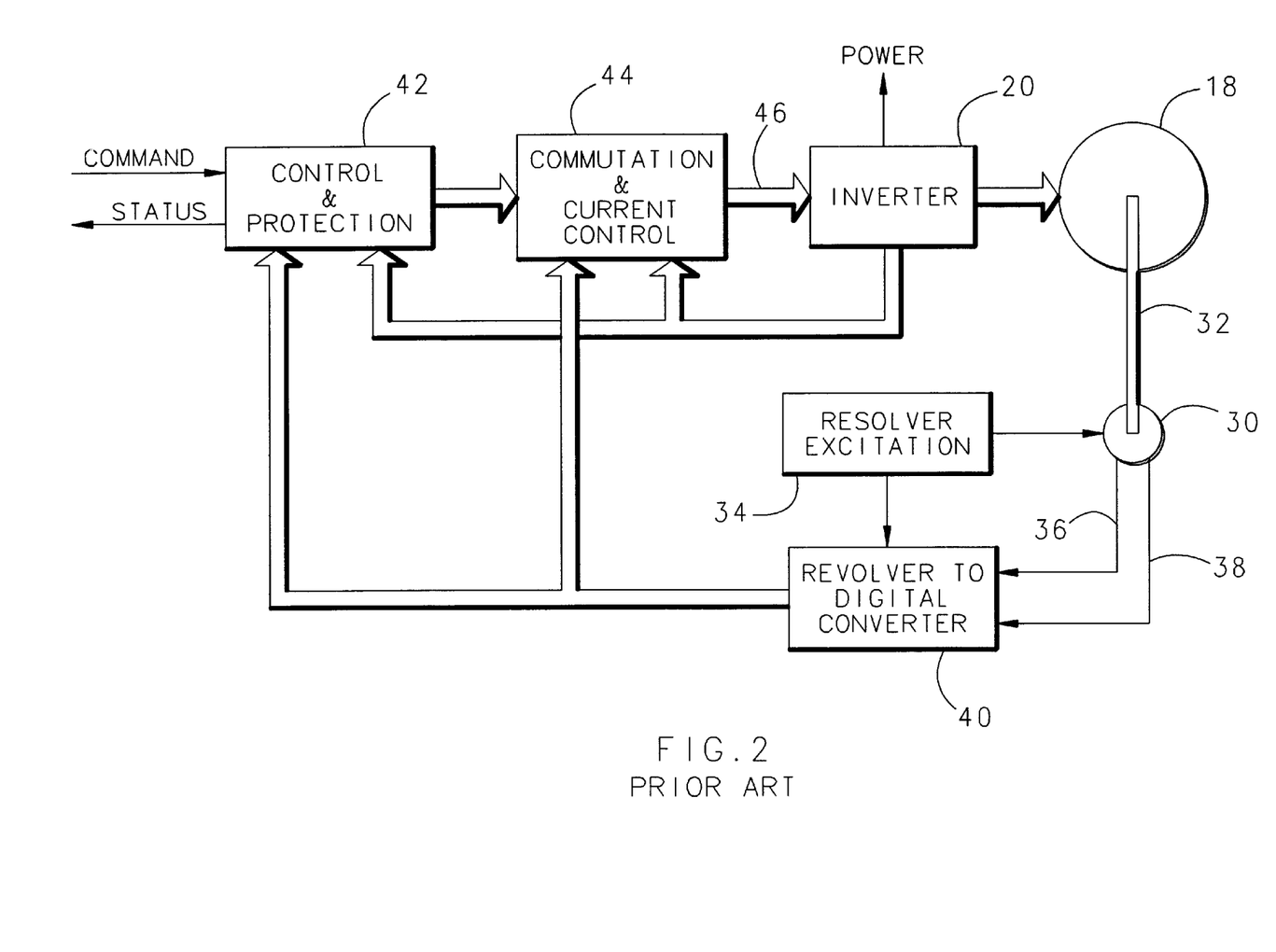
FIG. 2 comprises a block diagram of a prior art inverter control, inverter and switched reluctance machine.

Referring now to FIG. 2, a prior art inverter control for operating the switched reluctance machine 18 includes a resolver 30, which is coupled by a motive power shaft 32 to the rotor of the switched reluctance machine 18. Excitation is provided by a resolver excitation circuit 34. The resolver 30 develops first and second signals over lines 36, 38 that have a phase quadrature relationship (also referred to as sine and cosine signals). A resolver-to-digital converter 40 is responsive to the magnitudes of the signals on the lines 36 and 38 and develops a digital output representing the position of the rotor of the switched reluctance machine 18. The position signals are supplied along with a signal representing machine rotor velocity to a control and protection circuit 42. The rotor position signals are also supplied to a commutation and current control circuit 44 having an input coupled to an output of the control and protection circuit 42.

The circuits 42 and 44 further receive phase current magnitude signals as developed by the inverter 20. The circuits 42 and 44 develop switch drive signals on lines 46 for the inverter 20 so that the phase currents flowing in the windings of the switched reluctance machine 18 are properly commutated.

As noted previously, the resolver 30 is expensive and inherently a source of single point failure. Further, the resolver-to-digital converter 40 is also an expensive component and, hence, it is desirable to eliminate these and other components (including the excitation circuit 34), if possible.

Figure 3:
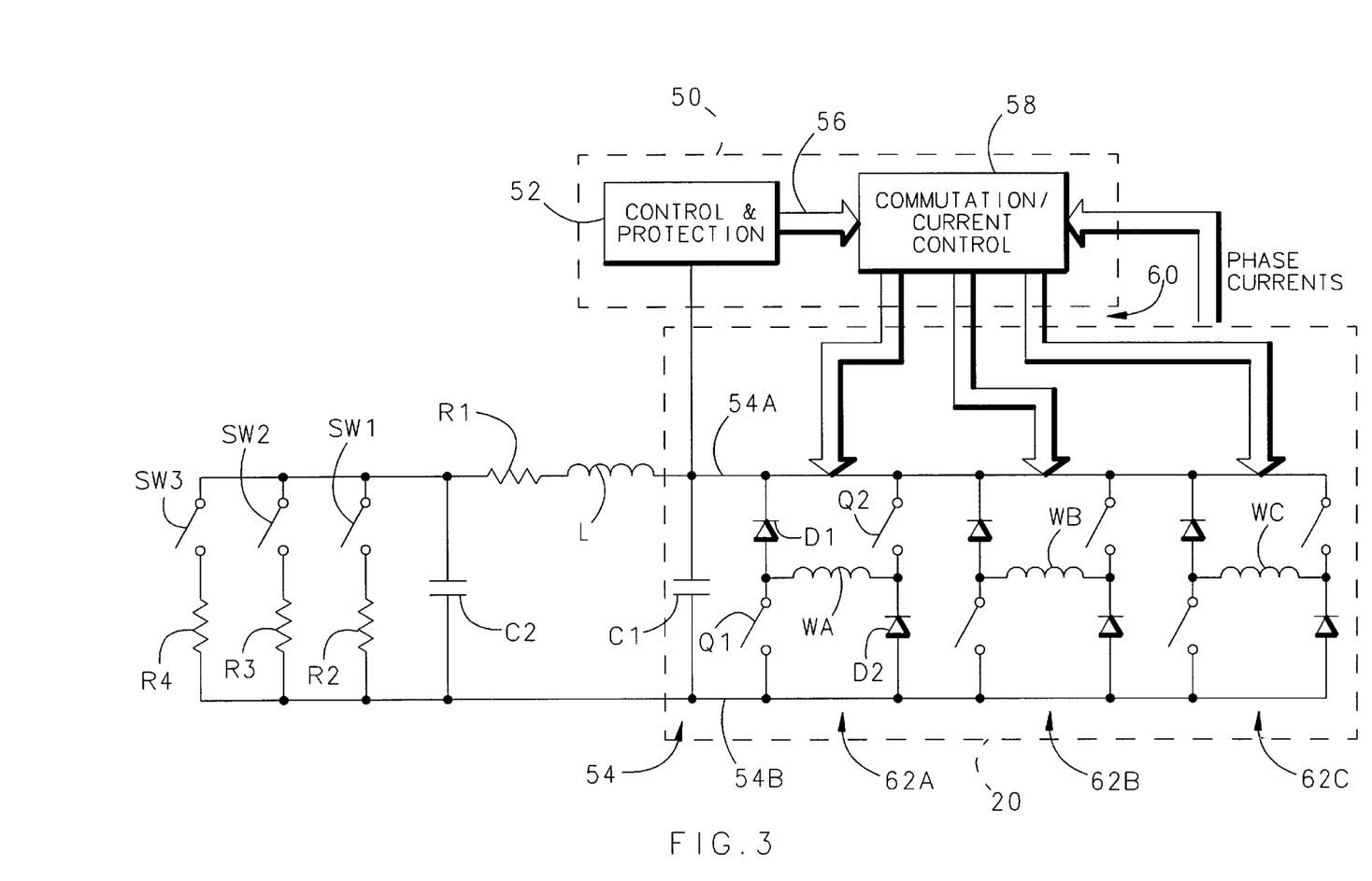
FIG. 3 comprises a block diagram of an inverter control incorporating the present invention together with an inverter and phase windings of a switched reluctance machine.

FIG. 3 illustrates an inverter control 50 that incorporates the present invention together with the inverter 20 and phase windings WA, WB and WC of the switched reluctance machine 18. The inverter control 50 includes a control and protection circuit 52 which is responsive to a magnitude of DC bus voltage appearing on a DC bus 54 and which further develops reference signals on a series of lines 56 for a commutation/current control 58. The commutation/circuit control 58 is further responsive to the magnitudes of phase currents developed by the inverter 20 and develops switch operating signals over lines 60 for switches in the inverter legs. As seen in the embodiment of FIG. 3, the inverter 20 includes three legs 62A, 62B, and 62C which are coupled to the three phase windings WA, WB, WC of the machine 18. Of course, if the machine 18 includes a greater or lesser number of phases, the inverter 20 would include a like number of inverter legs, each identical to the legs 62A–62C. Because the inverter legs 62A–62C are identical, only the inverter leg 62A will be described in detail. The inverter leg 62A includes first and second controllable power switches Q1 and Q2 coupled together with diodes D1 and D2 across the phase winding WA. The commutation/circuit control 58 closes both of the switches Q1 and Q2 to excite the winding WA, opens one of the switches Q1 or Q2 and closes the other switch during a freewheeling mode of operation such that current flows through one of the diodes D1 or D2 or opens both of the switches Q1 and Q2 during a flyback mode of operation during which current flows through both of the diodes D1 and D2.

The inverter 20 further includes a bus capacitor C1 coupled across DC bus conductors 54a, 54b. A DC bus filter comprising an inductor L and a capacitor C2 together with a resistance R1 are coupled across the DC bus 54. One or more DC loads, represented by resistors R2–R4, are selectively coupled by switches or contactors SW1–SW3, respectively, across the capacitor C2.

Figure 4:
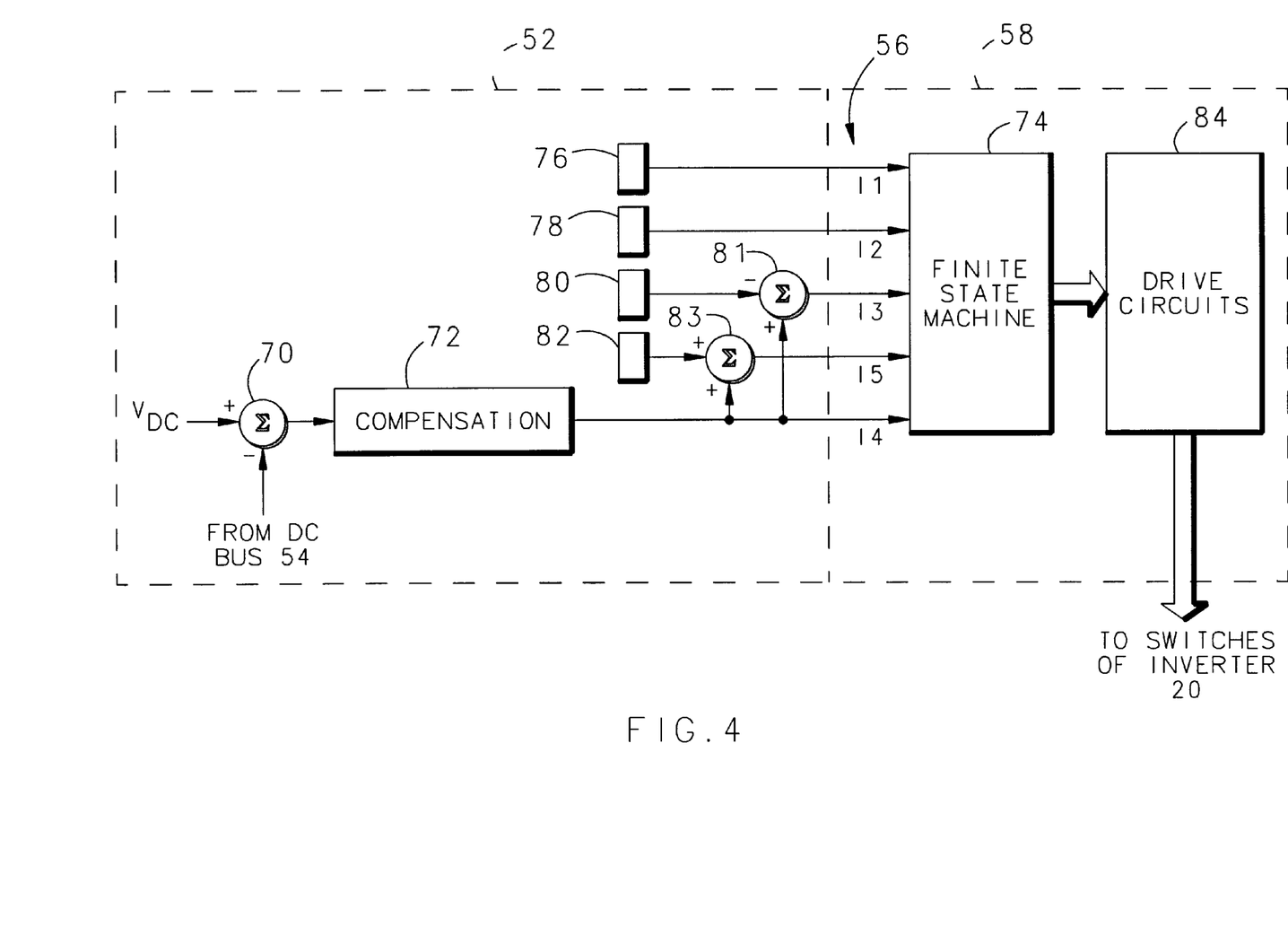
FIG. 4 comprises a block diagram of the control and protection circuit 52 and the commutation/current control 58 of FIG. 3.

FIG. 4 illustrates the control and protection circuit 52 and the commutation/circuit control 58 of FIG. 3 in greater detail. It should be noted that only those portions of the circuits 52 and 58 relevant to an understanding of the present invention are shown, it being understood that additional circuits may be included therein. The DC bus voltage magnitude signal as obtained from the DC bus 54 of FIG. 3 is provided to an inverting input of a summer 70 having a non-inverting input that receives a signal $V_{DC}$ representing a desired DC bus voltage magnitude. The resulting error signal is processed by a compensation circuit 72 which may provide, for example, proportional compensation and a resulting reference signal 14 is supplied to a finite state machine 74 of the commutation/circuit control 58 together with reference signals I1–I3 and I5. The signals I1 and I2 are developed by reference signal generators 76 and 78 whereas the signals I3 and I5 are developed by reference signal generators 80 and 82 and summers 81 and 83. The signals I1–I5 are in order of increasing magnitude and, as should be evident, the signals I1 and I2 are fixed whereas the signals I3–I5 vary as a function of DC bus voltage magnitude, with I3 and I5 being offset from I4 by fixed amounts determined by the reference signal generators 80 and 82. The finite state machine 74 develops control signals for drive circuits 84 which in turn develop drive signals for the switches of the inverter 20.

Figure 5:
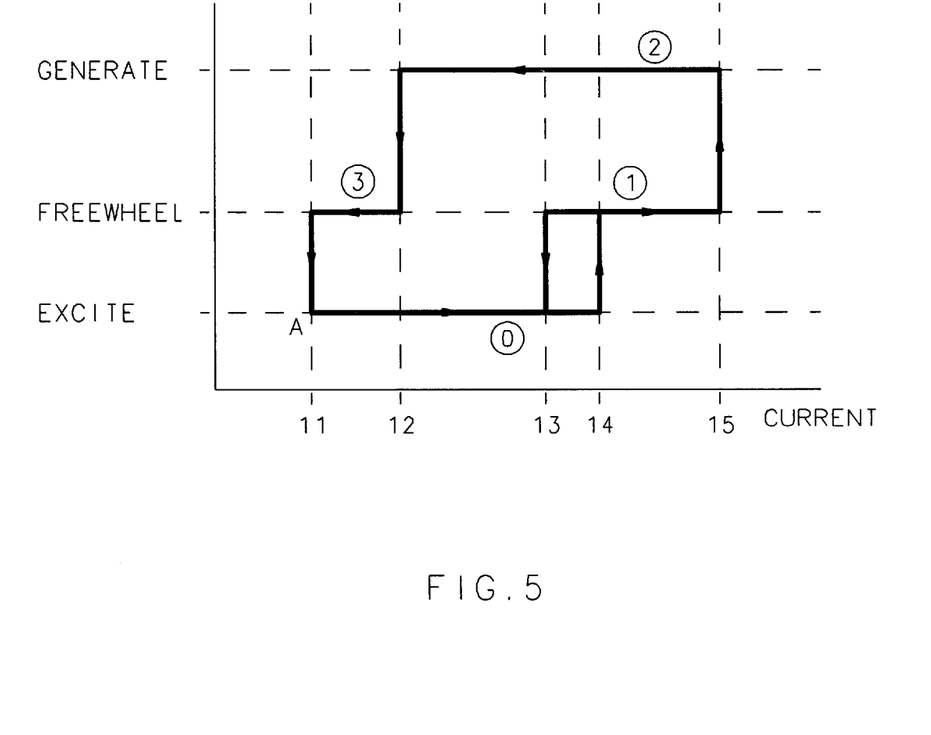
FIGS. 5 and 6 comprise state diagrams illustrating operation of the finite state machine of FIG. 4.
Figure 6:
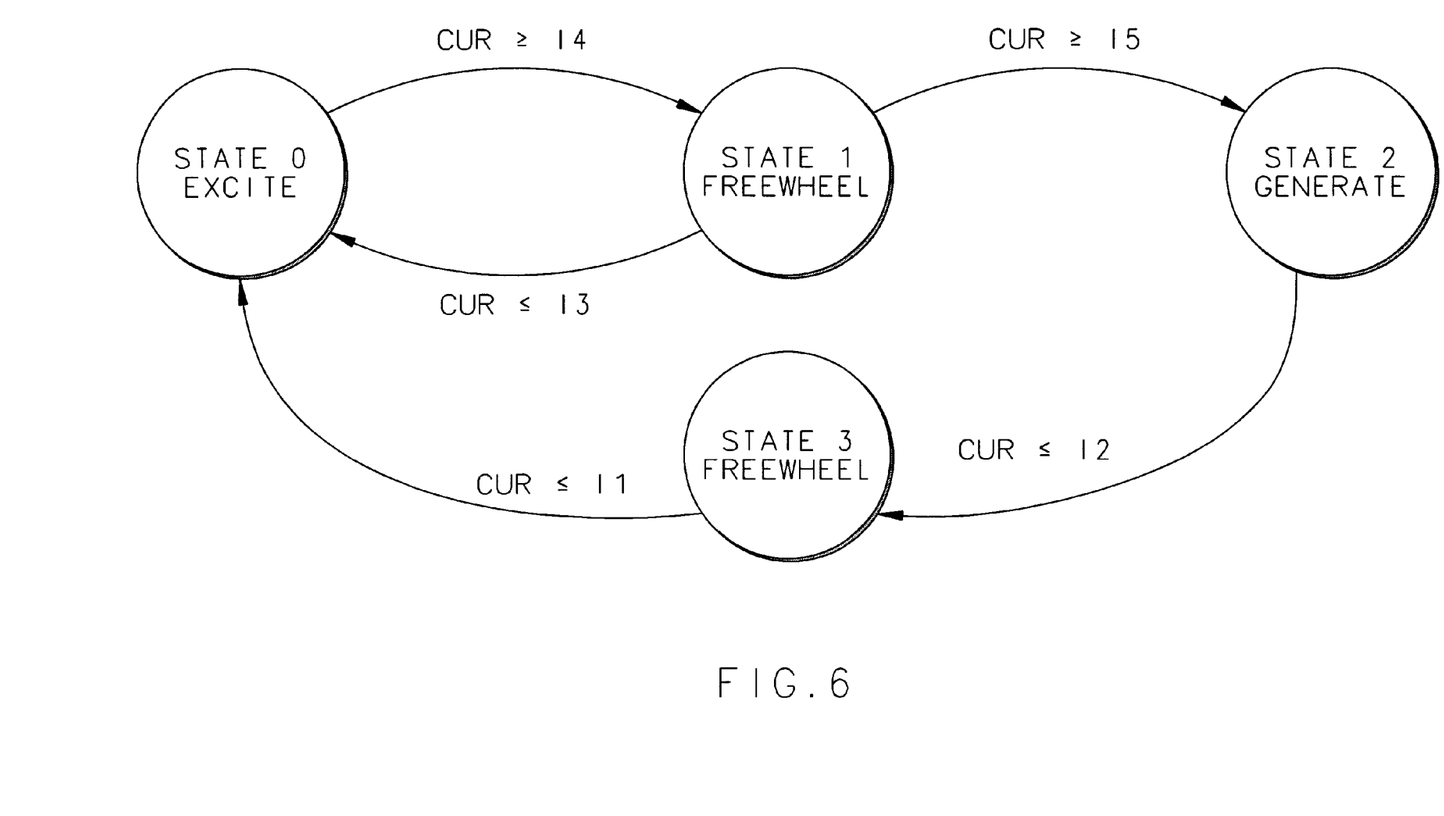

Each of FIGS. 5 and 6 illustrates the operation of the finite state machine 74 of FIG. 4. The finite state machine 74 is capable of assuming any one of four states for each machine phase, designated state 0 ("excite"), state 1 ("freewheel"), state 2 ("generate"), and state 3 ("freewheel"), depending upon the magnitude of the current flowing through the respective phase winding WA, WB or WC relative to the current magnitudes represented by the signals I1–I5. When the finite state machine 74 is in state 0, both of the switches of the respective inverter leg are closed or rendered conductive and the finite state machine 74 remains in such state until the current flowing through the respective phase winding WA–WC equals or exceeds the current magnitude I4, whereupon the finite state machine 74 assumes state 1. During operation in state 1, one of the switches in the respective inverter leg, for example the switch Q1 in the inverter leg 62A, is closed while the other inverter leg switch (e.g., Q2) is opened. The finite state machine 74 remains in such state until one of two occurrences arise. Under a first occurrence, the current flowing through the respective phase winding drops below the current magnitude I3, whereupon the finite state machine 74 reverts to state 0. If the current flowing through the respective phase winding meets or exceeds the current level I5, the finite state machine 74 switches to state 2, whereupon both of the switches in the respective inverter phase are opened.

The finite state machine 74 remains in state 2 until the current through the respective phase winding equals or drops below the current magnitude I2, whereupon the finite state machine 74 assumes state 3. State 3 differs from state 1 in that the switch that was originally opened in state 1 is closed in state 3 and the switch that was originally closed in state 1 is opened in state 3. Thus, in the above example, the switch Q2 is closed and the switch Q1 is opened in state 3. The finite state machine 74 remains in state 3 for the respective machine phase until the current equals or drops below the current magnitude I1, whereupon the machine 74 reverts to state 0.

The finite state machine 74 thus assumes a plurality of states for each phase winding of the machine 18 based upon the current magnitude flowing through such winding.

The finite state machine 74 may be implemented by any hardware, software or a combination of the two in a fashion well within the capabilities of one of ordinary skill in the art. For example, the signals I1–I5 may be provided to suitable logic components including comparators, logic gates, etc . . . or may be provided to a look-up table. In either event, switch control signals for the switches of an inverter leg are developed. Duplicate circuitry/software responsive to the signals I1–I5 is provided for the remaining inverter legs so that the legs are independently controlled.

Figure 7:
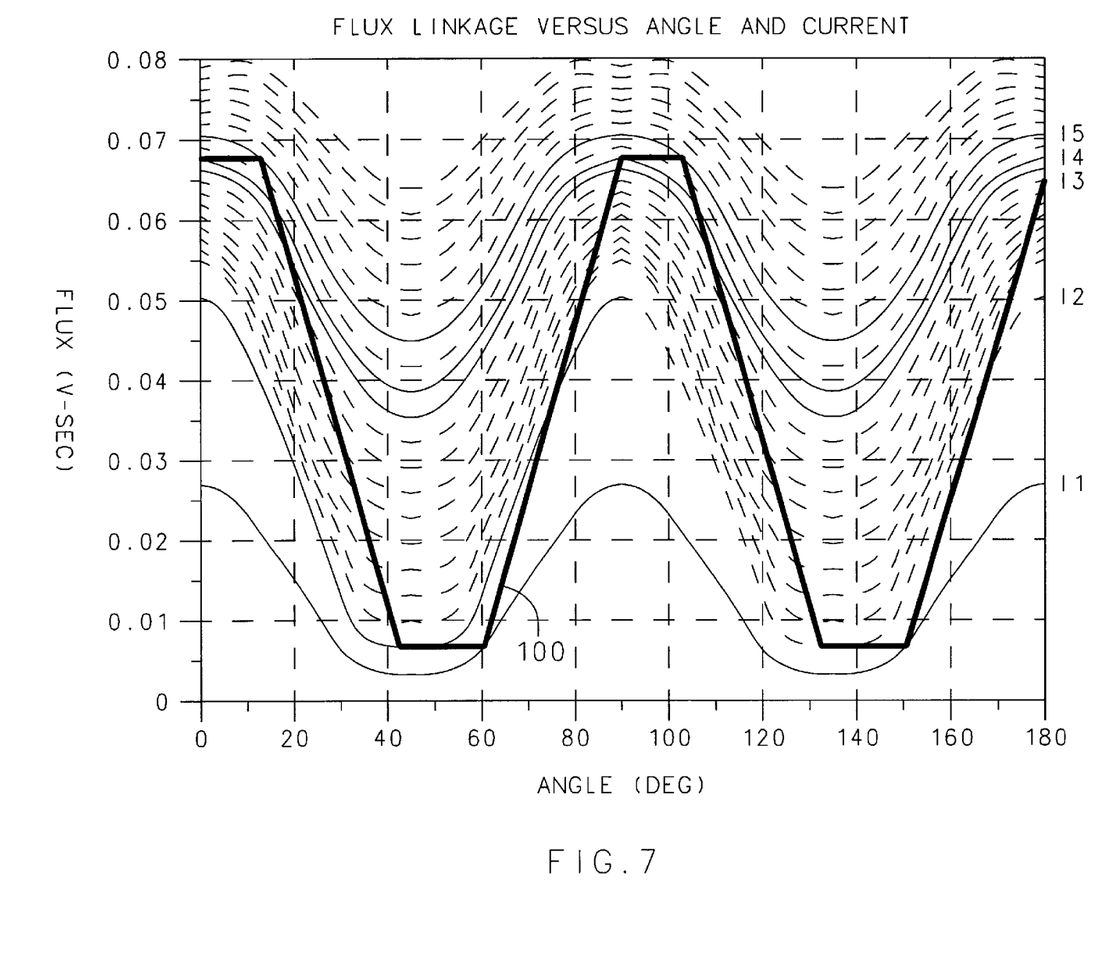
FIG. 7 comprises a graph illustrating flux linkage as a function of rotor angle and current during steady state operation of the machine of FIG. 3.

FIG. 7 illustrates flux linkage as a function of machine rotor angle for a plurality of constant current levels flowing in one of the phase windings of the machine 18. The reference current levels I1–I5 are shown by solid lines and the curve 100 illustrates the machine flux during rotation of the rotor of the machine 18 by 180°. The straight-line segments of the curve 100 where flux linkage is increasing is due to closure of both switches in the respective inverter leg whereas the straight-line segments of the curve 100 where flux linkage is decreasing is due to opening of both switches in the respective inverter leg. During the segments of the curve 100 where flux linkage remains constant, only one of these switches of the respective inverter leg is closed while the other is open.

Figure 8A:
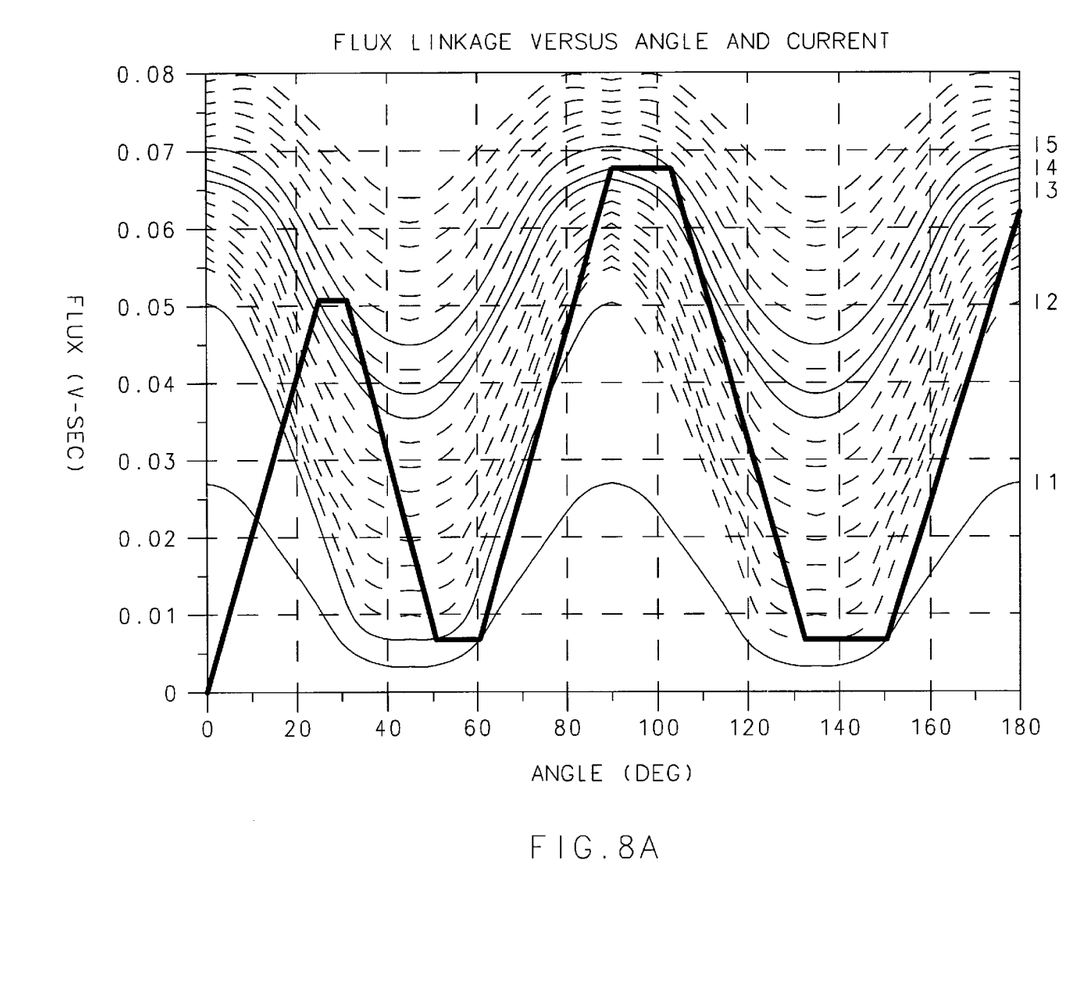
FIGS. 8A–8E comprise graphs similar to FIG. 7 during start-up of the machine of FIG. 3 from 0°, 20°, 40°, 60° and 80° initial rotor angle.
Figure 8B:
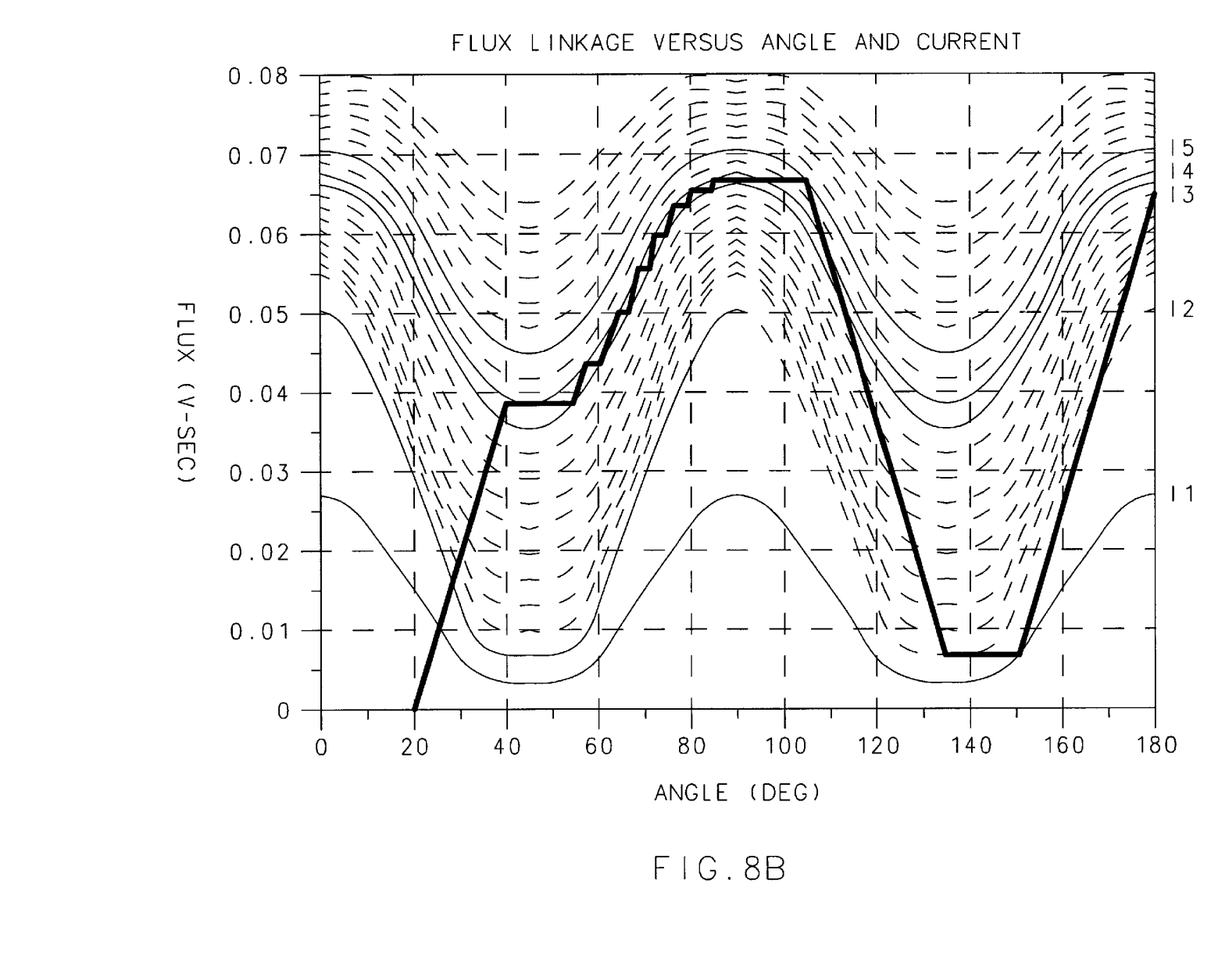
Figure 8C:
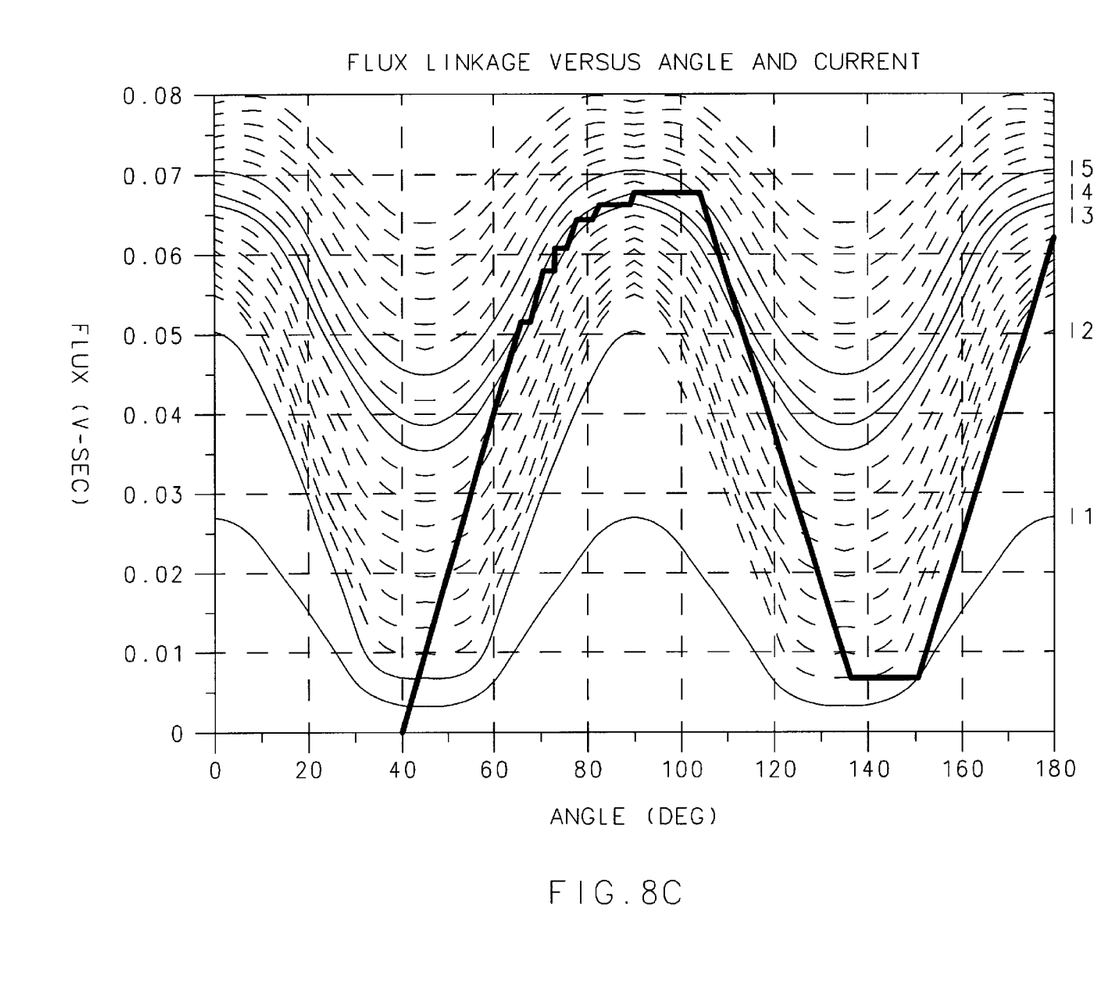
Figure 8D:
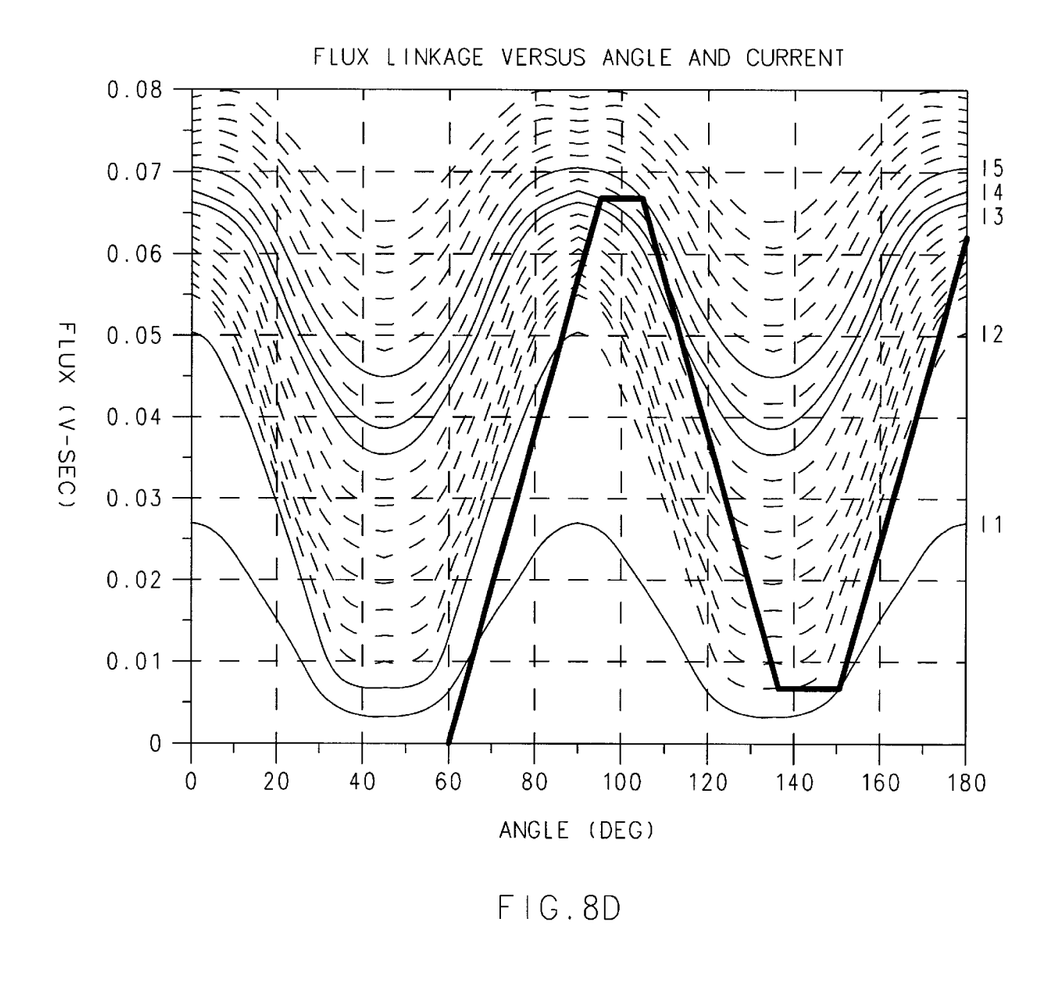
Figure 8E:
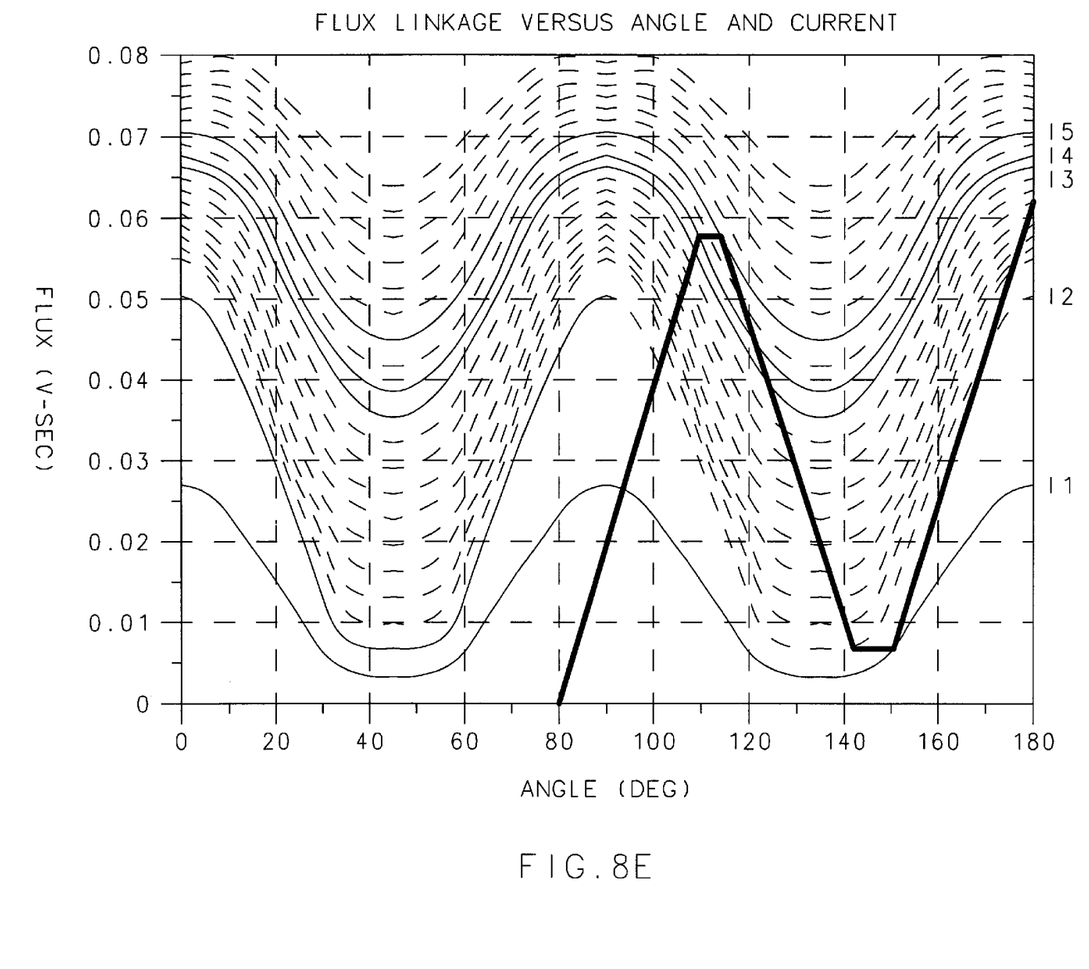

FIGS. 8A–8E are graphs identical to FIG. 7 showing operation of the present invention during startup, i.e., before study state operation as seen in FIG. 7 is achieved. FIG. 8A illustrates startup where the pole formed by the respective phase winding of the machine 18 is initially exactly aligned with a rotor pole of the machine 18 whereas FIGS. 8B, 8C, 8D and 8E illustrate startup where a rotor pole is initially displaced 20°, 40°, 60° and 80°, respectively, with respect to the stator pole. In each case, the flux linkage approaches the steady state flux within one electrical cycle.

Figure 9:
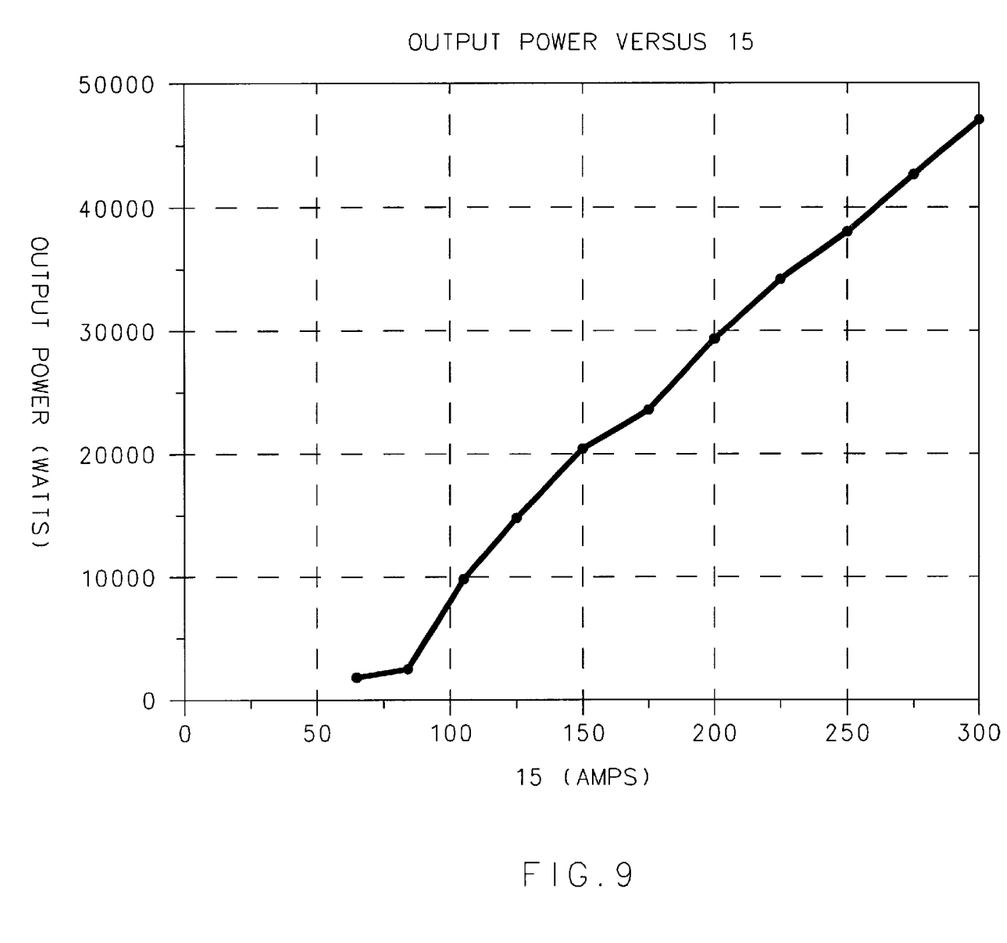
FIG. 9 comprises a graph illustrating output power as a function of magnitude of the reference signal 15 of FIG. 4.

FIG. 9 illustrates output power of the machine 18 as a function of the magnitude of the reference signal 15. The relatively straight-line characteristic curve illustrates the high degree of controllability afforded by the present invention.

It should be noted that the magnitude of the reference signal I5 might alternatively be varied by the circuits 70 and 72 of FIG. 4 and that the signals I3 and I4 could be offset by constant amounts from I5, if desired. Alternatively, a greater or lesser number of levels I1–I5 could be used and any number of levels could vary with DC bus voltage or another parameter as long as the magnitudes of the levels are selected to obtain a proper operating characteristic. In the preferred embodiment, the magnitudes of I1 and I2 are selected to maintain current in the respective phase winding at all times and the magnitude of I5 is selected to obtain the desired power output of the machine. In addition, the magnitudes of the signals I3 and I4 are selected to obtain a proper operating cycle.

The apparatus and method of the present invention does not require position sensors or estimation apparatus, and hence simplicity is enhanced as compared with previous designs. Because no position sensing or estimation is undertaken, no specialized hardware or software need be utilized and the finite state machine may be implemented by simple devices. In fact, the portions of the circuits 52 and 58 shown in FIG. 4 may be implemented by any suitable hardware or software or a combination of the two.

It should be noted that the RMS current flowing through the capacitor C1 is significantly reduced as compared with prior sensor-based or sensorless commutation techniques for a switched reluctance machine. Accordingly, the size of the bus capacitor C1 might advantageously be reduced to reduce size, weight, and/or cost of the overall system. Further, greater current levels can be made available at low output voltage magnitudes and hence fault-clearing capability is favorably enhanced.

In summary, the present invention does not require repetitive intensive calculations of rotor position, nor is it specific to a fixed relationship between flux linkage, phase current and rotor position for a given machine. Further, there is no need to obtain an initial rotor position or to reacquire rotor position following a loss of position information. Still further, the present invention does not require accurate integration to calculate flux linkage and does not require either a measurement of bus voltage or require that the bus voltage not vary significantly for aggregate estimates of flux linkage.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

I claim:

1. A control for a switched reluctance machine having a machine rotor and a machine winding coupled to a power converter, comprising:

means for detecting a magnitude of current flowing in the machine winding; and means responsive to the detecting means for controlling commutation of the switched reluctance machine in four finite states in dependence upon the detected current magnitude flowing in the machine winding during each of said four finite states without determining machine rotor position.

2. The control of claim 1, wherein the controlling means includes means responsive to the detecting means for comparing the detected magnitude of current against a reference level.

3. The control of claim 2, wherein the comparing means comprises a finite state machine.

4. The control of claim 1, wherein the power converter is coupled to a DC bus on which a DC voltage is developed and wherein the controlling means is further responsive to the DC voltage.

5. The control of claim 4, wherein the controlling means includes means responsive to the detecting means for comparing the detected magnitude of current against a plurality of reference levels and means for varying one of the reference levels in dependence upon a magnitude of the DC voltage.

6. In a system for sensorless control of a switched reluctance machine having a machine rotor and a plurality of phase windings each coupled to a leg of an inverter, a control for commutating currents flowing in the phase windings, comprising:

means for detecting magnitudes of currents flowing in the phase windings; and means responsive to the detecting means for controlling commutation of the switched reluctance machine in four finite states in dependence upon the detected current magnitudes flowing in the machine winding during each of said four finite states without determining machine rotor position.

7. The control of claim 6, wherein the controlling means includes means responsive to the detecting means for comparing the detected magnitude of current against a reference level.

8. The control of claim 7, wherein the comparing means comprises a finite state machine.

9. The control of claim 6, wherein the power converter is coupled to a DC bus on which a DC voltage is developed and wherein the controlling means is further responsive to the DC voltage.

10. The control of claim 9, wherein the controlling means includes means responsive to the detecting means for comparing the detected magnitude of current against a plurality of reference levels and means for varying one of the reference levels in dependence upon a magnitude of the DC voltage.

11. A method of controlling a switched reluctance machine having a machine rotor and a machine winding coupled to a power converter, the method comprising the steps of:

detecting a magnitude of current flowing in the machine winding; and controlling commutation of the switched reluctance machine in four finite states in dependence upon the detected current magnitude flowing in the machine winding during each of said four finite states without determining machine rotor position.

12. The method of claim 11, wherein the step of controlling includes the step of comparing the detected magnitude of current against a plurality of reference levels.

13. The method of claim 12, wherein the step of comparing includes the step of using a finite state machine.

14. The method of claim 13, wherein the inverter is coupled to a DC bus on which a DC voltage is developed and wherein the step of controlling includes the step of varying one of the reference levels in dependence upon the DC voltage.

* * * * *